(12) United States Patent
Corden

(10) Patent No.: US 10,017,935 B2
(45) Date of Patent: Jul. 10, 2018

(54) QUICK ATTACHMENT SYSTEM FOR MODULAR CONSTRUCTION

(71) Applicant: David A. Corden, Knoxville, TN (US)

(72) Inventor: David A. Corden, Knoxville, TN (US)

(\*) Notice: Subject to any disclaimer, the term of this patent is extended or adjusted under 35 U.S.C. 154(b) by 0 days.

(21) Appl. No.: 14/816,578

(22) Filed: Aug. 3, 2015

(65) Prior Publication Data

US 2015/0337883 A1 Nov. 26, 2015

Related U.S. Application Data

(63) Continuation-in-part of application No. 13/852,741, filed on Mar. 28, 2013, now abandoned.

(51) Int. Cl.
| | |
|---|---|
| *F16B 5/07* | (2006.01) |
| *E04B 1/58* | (2006.01) |
| *A47B 47/02* | (2006.01) |
| *A47B 47/00* | (2006.01) |
| *E04B 2/74* | (2006.01) |

(52) U.S. Cl.
CPC .......... *E04B 1/5818* (2013.01); *A47B 47/028* (2013.01); *F16B 5/07* (2013.01); *A47B 47/0083* (2013.01); *E04B 1/5806* (2013.01); *E04B 2/7453* (2013.01); *E04B 2001/5868* (2013.01); *Y10T 403/50* (2015.01); *Y10T 403/70* (2015.01)

(58) Field of Classification Search
CPC ............ E04C 2003/0473; E04B 2/767; E04B 1/2403; E04B 1/2604; E04B 2001/2448
USPC .... 52/238.1, 241, 481.1, 481.2, 220.5, 36.5; 403/14, 136, 300, 292, 306, DIG. 15; 248/68.1

See application file for complete search history.

(56) References Cited

U.S. PATENT DOCUMENTS

| | | | |
|---|---|---|---|
| 2,037,889 A | | 4/1936 | Doud |
| 2,683,927 A | * | 7/1954 | Maronek .................. B21D 5/01 29/521 |
| 3,760,550 A | | 9/1973 | Mueller et al. |
| 3,785,108 A | | 1/1974 | Satchel |
| 3,925,875 A | * | 12/1975 | Doke .................... B21D 39/034 29/21.1 |
| 3,934,382 A | | 1/1976 | Gartung |
| 4,034,463 A | | 7/1977 | Ryan |
| 4,118,903 A | | 10/1978 | Coulthard |
| 4,370,838 A | | 2/1983 | Vermillion |
| 4,459,790 A | | 7/1984 | Vermillion |

(Continued)

*Primary Examiner* — Joshua T Kennedy
(74) *Attorney, Agent, or Firm* — J. A. Lindeman & Co., PLLC

(57) ABSTRACT

A quick attachment system is disclosed. A first connector portion is defined along a surface of the first member and a second connector portion is defined along a surface of the second member. The first connector portion comprises a protrusion of the surface of the first member. The second connector portion comprises a detent of the surface of the second member. The first and second connector portions may mate with and engage one another to secure the first member against the second member. A modular frame unit comprises first and second channel members defining first connector portions along lengths thereof and a joinder channel member defining second connector portions along a length thereof. Each of the second connector portions is configured to mate with one of the first connector portions to join the joinder channel member with the first and second channel members.

26 Claims, 13 Drawing Sheets

(56) References Cited

U.S. PATENT DOCUMENTS

| | | | |
|---|---|---|---|
| 4,651,484 A | 3/1987 | Rutkowski | |
| 4,715,502 A * | 12/1987 | Salmon | H04Q 1/09 |
| | | | 211/175 |
| 4,991,368 A | 2/1991 | Amstutz | |
| 5,216,859 A | 6/1993 | Moreno et al. | |
| 5,222,335 A | 6/1993 | Petrecca | |
| 5,285,615 A * | 2/1994 | Gilmour | E04B 2/7412 |
| | | | 52/781 |
| 5,341,615 A | 8/1994 | Hodges et al. | |
| 5,394,665 A | 3/1995 | Johnson | |
| 5,412,919 A | 5/1995 | Pellock et al. | |
| 5,440,854 A | 8/1995 | Hohmann | |
| 5,660,012 A * | 8/1997 | Knudson | B21D 39/034 |
| | | | 52/241 |
| 5,791,093 A | 8/1998 | Diamond | |
| 5,839,848 A * | 11/1998 | Sahramaa | B21D 39/032 |
| | | | 403/274 |
| 5,970,672 A | 10/1999 | Robinson | |
| 6,047,508 A | 4/2000 | Goodman et al. | |
| 6,047,513 A | 4/2000 | Gibson | |
| 6,115,977 A | 9/2000 | Hornberger et al. | |
| 6,130,887 A | 10/2000 | Dutta | |
| 6,223,908 B1 * | 5/2001 | Kurtsman | H04Q 1/08 |
| | | | 211/175 |
| 6,276,103 B1 | 8/2001 | Waalkes et al. | |
| 6,318,044 B1 | 11/2001 | Campbell | |
| 6,425,219 B1 | 7/2002 | Barmak et al. | |
| 6,568,138 B1 * | 5/2003 | Frost | E04B 2/767 |
| | | | 52/241 |
| 6,601,349 B1 * | 8/2003 | Corden | E04B 2/7453 |
| | | | 52/126.4 |
| 6,612,090 B1 | 9/2003 | Corden | |
| 6,634,152 B1 | 10/2003 | Pilkinton | |
| 6,655,533 B2 * | 12/2003 | Guebre-Tsadik | H05K 7/186 |
| | | | 211/175 |
| 6,668,508 B2 | 12/2003 | Boone et al. | |
| 7,086,207 B2 | 8/2006 | Pilburn et al. | |
| 7,185,460 B2 | 3/2007 | Corden | |
| 7,712,260 B2 | 5/2010 | Vardaro et al. | |
| 7,798,461 B2 | 9/2010 | Hackney | |
| 7,866,112 B2 * | 1/2011 | Edmondson | E04B 1/24 |
| | | | 52/633 |
| 8,028,487 B2 | 10/2011 | Engstrom | |
| 8,225,581 B2 * | 7/2012 | Strickland | E04C 3/07 |
| | | | 52/481.1 |
| 2003/0208973 A1 | 11/2003 | Corden | |
| 2008/0016818 A1 | 1/2008 | Heirich | |
| 2009/0178983 A1 * | 7/2009 | Green | H05K 7/186 |
| | | | 211/13.1 |
| 2012/0066989 A1 * | 3/2012 | Pilz | E04B 2/7411 |
| | | | 52/232 |

\* cited by examiner

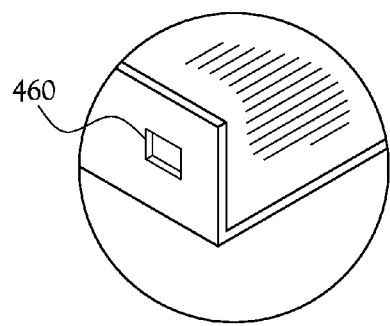 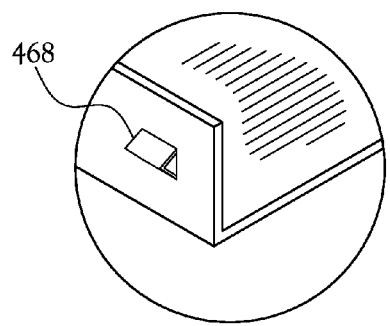
Fig.12A    Fig.12B
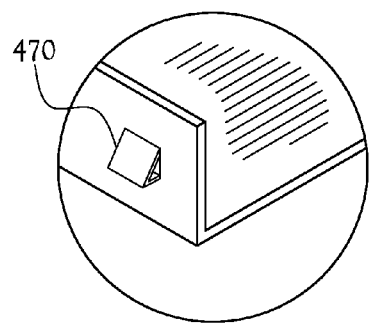 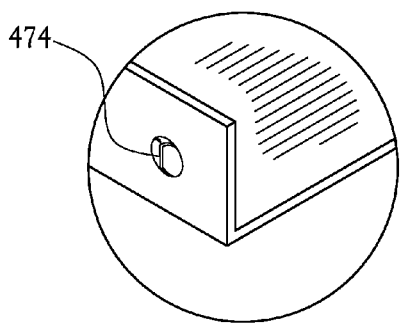
Fig.12C    Fig.12D

QUICK ATTACHMENT SYSTEM FOR MODULAR CONSTRUCTION

CROSS-REFERENCE TO RELATED APPLICATIONS

This application is a continuation-in-part of prior application Ser. No. 13/852,741, filed on Mar. 28, 2013, incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The present general inventive concept concerns modular construction systems that may be assembled timely with little effort.

2. Description of the Related Art

Commonly, modular construction systems comprise horizontal stringers or channels which may be freestanding or which may be secured to an interior wall of a facility, vertical standards which may be secured to the stringers, and planar panels which may be secured between the standards. This structure may, in certain applications, provide a support structure which may be used as a temporary or permanent wall, shelf, enclosure, or the like.

It is frequently desired that a modular construction system be free-standing, that is, the system is not anchored to either the ceiling or the wall of the retail establishment so that the system may be relocated within the establishment without reference to the permanent walls of the establishment, and without the need to modify other fixtures of the establishment, such as for example lighting, heat and air ducts, sprinklers, etc. An exemplary modular construction system may be found in U.S. Pat. No. 7,185,460, entitled FREE-STANDING PANEL WALL SYSTEM, issued to David Gorden, the entirety of the disclosure of which is hereby incorporated herein by reference.

Other prior art may comprise the following:

| U.S. Pat. No. | Inventor(s) | Issue Date |
| --- | --- | --- |
| 2,037,889 | A. N. Doud | Apr. 21, 1936 |
| 3,934,382 | C. W. Gartung | Jan. 27, 1976 |
| 4,034,463 | R. E. Ryan Jul. | December 1977 |
| 4,118,903 | J. A. Coulthard | Oct. 10, 1978 |
| 4,370,838 | E. F. Vermillion | Feb. 1, 1983 |
| 4,459,790 | E. F. Vermillion | Jul. 17, 1984 |
| 4,651,484 | E. J. Rutkowski | Mar. 24, 1987 |
| 4,991,368 | D. D. Amstutz | Feb. 12, 1991 |
| 5,216,859 | J. L. Moreno et al. | Jun. 8, 1993 |
| 5,341,615 | R. R. Hodges et al. | Aug. 30, 1994 |
| 5,412,919 | M. A. Pellock et al. | May 9, 1995 |
| 5,440,854 | R. P. Hohmann | Aug. 15, 1995 |
| 5,791,093 | G. C. Diamond | Aug. 11, 1998 |
| 6,115,977 | T. G. Hornberger et al. | Sep. 12, 2000 |
| 6,226,947 | J. J. Bado et al. | May 8, 2001 |
| 6,425,219 | J. Barmak et al. | Jul. 30, 2002 |

Modular construction systems desirably are to be readily constructed in situ and readily removable, both at minimum expense and damage to the permanent building and with maximum precision as to the finished dimensions of the modular construction system. Efforts regarding such systems have led to continuing developments to improve their versatility, practicality and efficiency.

BRIEF SUMMARY OF THE INVENTION

The present general inventive concept provides a quick attachment system for securing a first member against a second member. In one embodiment, the quick attachment system may comprise a first connector portion defined along a surface of the first member, the first connector portion comprising a protrusion of the surface of the first member. A second connector portion may be defined along a surface of the second member, the second connector portion comprising a detent of the surface of the second member. The first and second connector portions may be sized and shaped to mate with and engage one another to secure the first member against the second member. Example embodiments of the present general inventive concept can be achieved wherein the first connector portion comprises a first through hole defined in a surface of the first member, the first through hole having an annular, flared lip protruding outwardly from a perimeter of the hole. Example embodiments of the present general inventive concept can also be achieved wherein the second connector portion comprises a second through hole sized and shaped to receive and engage the annular, flared lip of the first connector portion within the second through hole. Example embodiments of the present general inventive concept can be achieved wherein the first connector portion is rotatable within the second connector portion. Example embodiments of the present general inventive concept can also be achieved wherein the first and second connector portions are adapted to receive a fastener therethrough to rotatably secure the first member against the second member.

The present general inventive concept also provides a modular frame unit comprising a first channel member defining a first plurality of first connector portions along a length thereof, a second channel member defining a second plurality of first connector portions along a length thereof, and a joinder channel member defining a plurality of second connector portions along a length thereof. In certain embodiments, each of the second connector portions is configured to mate with one of the first connector portions to join the joinder channel member with the first and second channel members. Example embodiments of the present general inventive concept can be achieved wherein at least one of the first channel member, the second channel member, and the joinder channel member comprises a U-shaped channel.

Example embodiments of the present general inventive concept can also be achieved wherein each of the first and second connector portions is integral with a respective corresponding channel member. Example embodiments of the present general inventive concept can also be achieved wherein the joinder channel member is rotatably attached to each of the first and second channel members via a mating engagement of at least two of the second connector portions of the joinder channel member with respective first connector portions of the first and second channel members. Example embodiments of the present general inventive concept can be achieved by providing at least one vertical upright fixed to the joinder channel member and extending perpendicular to the joinder channel member. Example embodiments of the present general inventive concept can be achieved in which the at least one vertical upright comprises an attachment leg and a stiffening leg. Example embodiments of the present general inventive concept can be achieved in which the at least one vertical upright is defined by a T-shaped channel. Example embodiments of the present general inventive concept can be achieved in which at least one of the connector portions comprises at least one of the following: a rectangular hole, a square hole, a rectangular hole having a triangular extension, an elliptical hole, and an oblong hole. Example embodiments of the present general inventive concept can be achieved wherein at least one of the channels is configured to mate with and join to a channel of an adjacent modular frame unit. Example embodiments of the present general inventive concept can be achieved wherein at least one of the connector portions is fabricated by stamping; molding; extruding; machining; cutting; and casting.

The present general inventive concept also provides a modular construction system comprising a plurality of rigid upright members; a plurality of joinder members defining a plurality of first connector portions at spaced apart locations along each joinder member, each joinder member being fixed to and extending substantially perpendicular to a corresponding upright member; and a plurality of channel members defining a plurality of second connector portions at spaced apart locations along each channel member, at least one second connector portion of each channel member being mated with a first connector portion of a corresponding joinder member to rotatably secure the channel member to the corresponding joinder member between a collapsed position and an extended position. In certain embodiments, in the extended position, at least two of the first connector portions along each joinder member mate with and engage corresponding second connector portions of a corresponding channel member to secure the channel member in the extended position. Example embodiments of the present general inventive concept can also be achieved wherein each channel member is configured to mate with and engage a joinder member of an adjacent modular construction system.

BRIEF DESCRIPTION OF THE SEVERAL VIEWS OF THE DRAWINGS

The above-mentioned features of the invention will become more clearly understood from the following detailed description of the invention read together with the drawings in which:

FIG. 12A is a perspective view of one embodiment connector portion of a quick attachment system for modular construction;

FIG. 12B is a perspective view of another embodiment connector portion of a quick attachment system for modular construction;

FIG. 12C is a perspective view of another embodiment connector portion of a quick attachment system for modular construction;

FIG. 12D is a perspective view of another embodiment connector portion of a quick attachment system for modular construction;

DETAILED DESCRIPTION OF THE INVENTION

Figure 1:
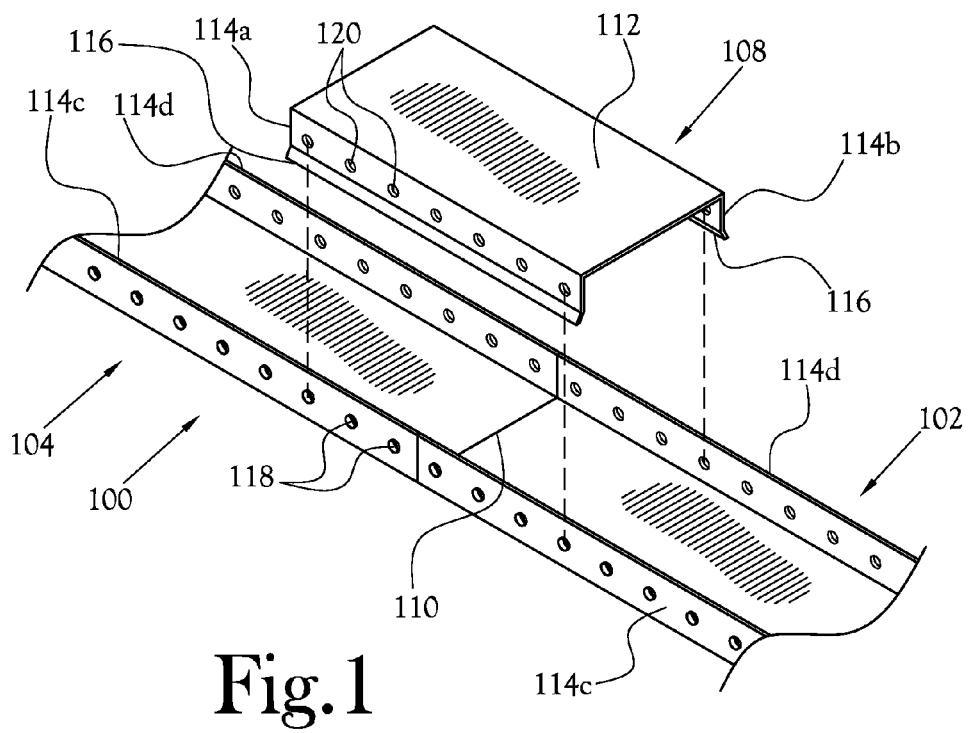
FIG. 1 is a partially exploded perspective view of one embodiment of a quick attachment system for modular construction according to several features of the present general inventive concept.

According to several features of the present general inventive concept, a quick attachment system for modular construction is disclosed herein and in the accompanying figures. The quick attachment system, or system, is illustrated generally at 100 in the figures. Referring to the exemplary embodiment illustrated in FIGS. 1-4, the system 100 may be useful, for example, to secure a plurality of members, such as the illustrated segments of channels 102, 104, 108, in rigid or rotatable connection to one another absent the need for additional or external fasteners. In the illustrated embodiment, first and second rigid, elongated channel segments 102, 104 are provided in a collinear configuration to be joined by a third channel 108. It will be understood that, while the illustrated channel segments 102, 104 are shown in an end-to-end configuration, the channel segments 102, 104 may, in certain embodiments, be separated from one another without departing from the spirit and scope of the present general inventive concept. As will further be discussed hereinbelow, a plurality of connectors 106 are collectively defined along each of the channels 102, 104, 108, such that the third channel 108 may be mated with the first and second channels 102, 104 to define a joinder segment joining the first and second channels 102, 104.

Figure 2:
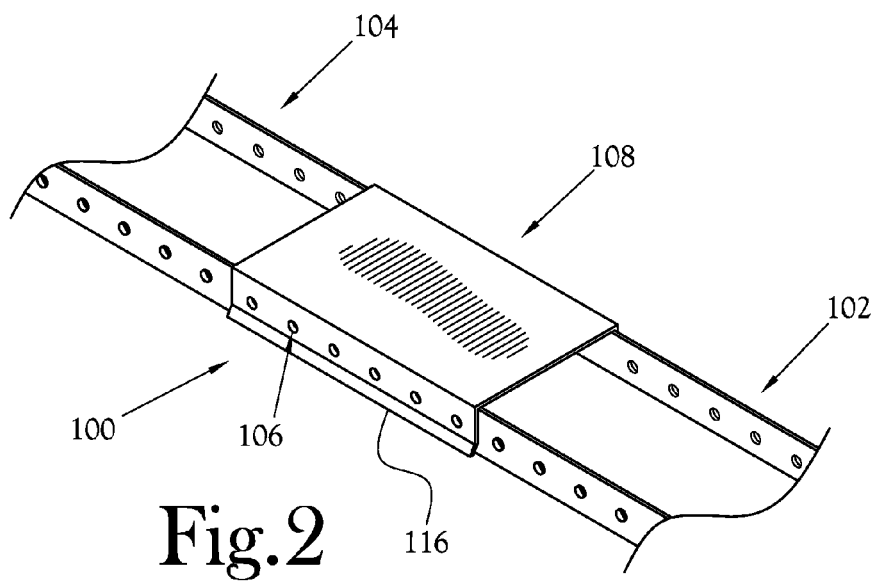
FIG. 2 is a perspective view of the quick attachment system for modular construction of FIG. 1.

Referring to FIGS. 1 and 2, in the illustrated embodiment, each channel 102, 104, 108 is comprised of a substantially rigid material, such as for example sheet metal, provided in a U-shaped configuration having a central, substantially planar web 112 and opposite first and second flanges 114 extending substantially perpendicularly thereto along opposite edges thereof. In several embodiments, the respective flanges 114a, 114b of the third channel 108 are adapted to substantially surround portions of the flanges 114c, 114d of the first and second channels 102, 104 at an interface 110 of the first and second channels 102, 104, thus establishing a mating relationship between the third channel 108 and each of the first and second channels 102, 104. For example, in certain embodiments, the width of each web 112 of the first and second channels 102, 104 may be slightly smaller than the width of the third channel 108, thereby allowing the flanges 114a, 114b of the third channel 108 to fit surrounding the flanges 114c, 114d of the first and second channels 102, 104. In other embodiments, the various channels 102, 104, 108 are capable of slight resilient deformation, such that the flanges 114a, 114b of the third channel 108 may be slightly outwardly deformed and/or the flanges 114c, 114d of the first and second channels 102, 104 may be slightly inwardly deformed to allow the third channel 108 to surround the flanges 114c, 114d of the first and second channels 102, 104. In some embodiments, resilient deformation of the channels 102, 104, 108 results in biasing of respective mating flanges 114 of the channels 102, 104, 108 toward one another, thereby establishing an at least partial frictional connection between the mating flanges 114.

Figure 3:
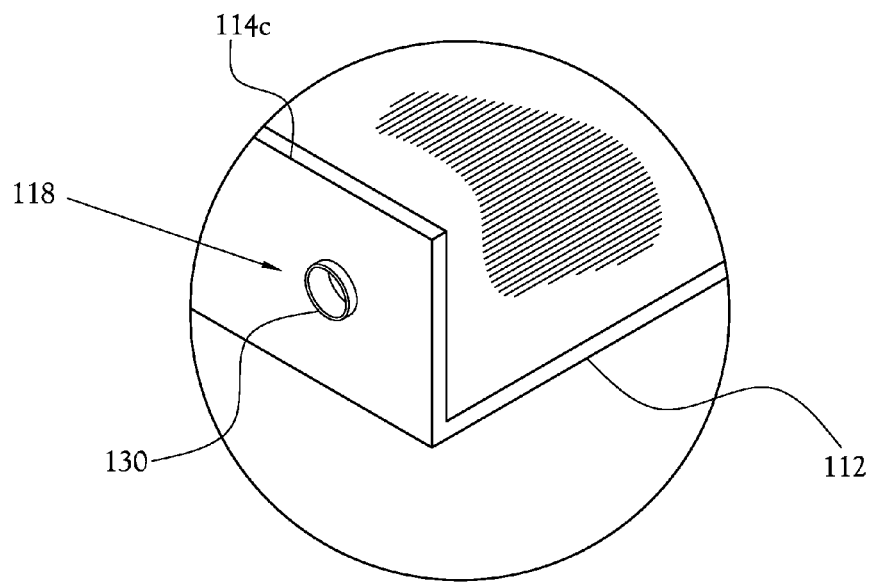
FIG. 3 is a perspective view of a first connector portion of the quick attachment system for modular construction shown in FIG. 1.
Figure 4:
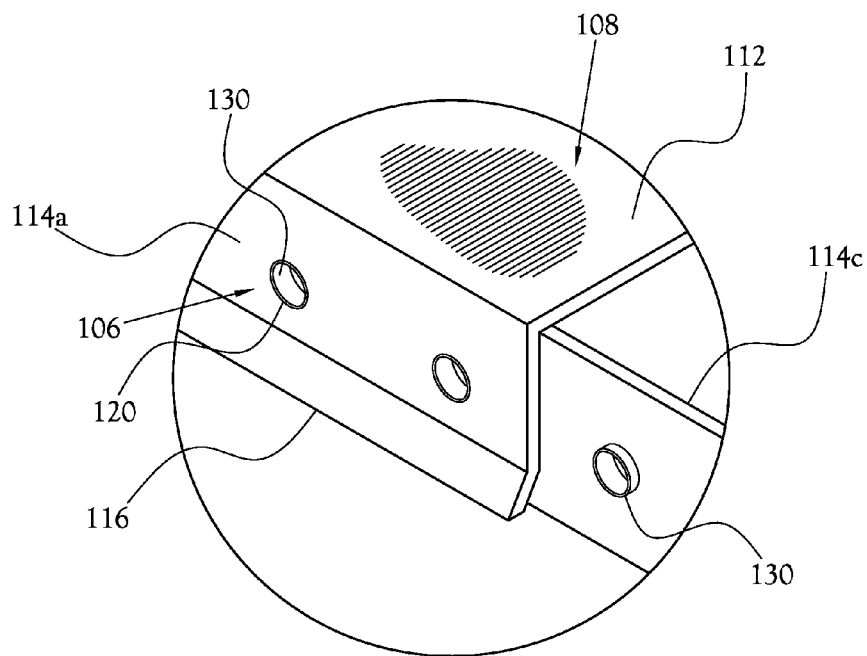
FIG. 4 is a perspective view of a connector of the quick attachment system for modular construction shown in FIG. 1.

As mentioned above, according to several features of the present general inventive concept, a plurality of mating connectors 106 are collectively defined at respective connection points along each of the various flanges 114 of the channels 102, 104, 108 to facilitate joinder of the channels 102, 104, 108 together. In several embodiments, each of the connectors 106 is defined by respective first and second mating connector portions 118, 120 defined by respective mating flanges 114 of the channels 102, 104, 108. Generally, each first mating connector portion 118 defines a protrusion which is adapted to be received within and engaged by a detent defining each second mating connector portion 120. For example, FIGS. 3 and 4 illustrate magnified views of the flanges 114 of the channels 102, 104, 108, and illustrate one embodiment of a connector 106 constructed in accordance with several features of the present general inventive concept. In the embodiment of FIGS. 3 and 4, each of the first connector portions 118, which are defined by the first and second channels 102, 104 in the present embodiment, comprises a circular hole having an annular, flared lip 130 protruding outwardly from a respective flange 114 of the first and second channels 102, 104. Each of the second connector portions 120, which are defined by the third channel 108 in the present embodiment, comprises an opening which is sized and shaped to receive the annular lip 130 of each first connector portion 118 therein and to engage the first connector portion 118 to limit sliding or lifting of the respective mating flanges 114 along one another. In one embodiment, the annular lip 130 of each first connector portion 118 extends sufficiently outwardly from its respective flange 114 that it may extend completely through a respective mated second connector portion 120 and protrude slightly outwardly from an exterior surface of the third channel 108. In another embodiment, the annular lip 130 of each first connector portion 118 is sized to extend through a respective mated second connector portion 120 and terminate flush with an exterior surface of the third channel 108. Those skilled in the art will recognize other configurations for the first connector portion 118 which may be used without departing from the spirit and scope of the present general inventive concept.

In the embodiment of FIGS. 1-4, each connector 106 comprises substantially rounded first and second connector portions 118, 120. Thus, in the present embodiment, a single connector 106 limits sliding or lifting of the respective mating flanges 114 along one another, but permits rotation of respective mating flanges 114 about the single connector 106. Referring again to FIGS. 1 and 2, in several embodiments, a plurality of connectors 106 are defined at spaced apart intervals along each of the channels 102, 104, 108. In these embodiments, when the third channel 108 is brought into engagement with an interface of the first and second channels 102, 104, a plurality of first connector portions 118 of the first channel 102 may be mated with corresponding second connector portions 120 of the third channel 108, and a plurality of first connector portions 118 of the second channel 104 may also be mated with corresponding second connector portions 120 of the third channel 108. In this configuration, the plurality of mated connectors 106 disposed along the channels 102, 104, 108 cooperate to rigidly fix the channels 102, 104, 108 in relation to one another.

As discussed above, in the present embodiment, the flanges 114a, 114b of the third channel 108 are positionable external to the flanges 114c, 114d of the first and second channels 102, 104. Thus, in the present embodiment, the various second connector portions 120 of the third channel 108 may be brought into mating engagement with the various first connector portions 118 of the first and second channels 102, 104 to establish a snap fit connection between the first channel 108 and the first and second channels 102, 104. In this way, the first and second channels 102, 104 may be secured in an end-to-end configuration in relation to one another.

In several embodiments, including the embodiment of FIGS. 1-4, the distal edges 116 of each of the flanges 114a, 114b of the third channel 108 define outwardly projecting flares or curvature to facilitate fitting of the flanges 114a, 114b of the third channel 108 surrounding the flanges 114c, 114d of the first and second channels 102, 104. In the present embodiment, each distal edge 116 of each of the flanges 114a, 114b of the third channel 108 is flared slightly outwardly, such that the various first connector portions 118 extending outwardly along external surfaces of the flanges 114c, 114d of the first and second channels 102, 104 may be received between the distal edges 116 of the flanges 114a, 114b of the third channel 108 absent the need for deformation of the channels 102, 104, 108. Thereafter, the channels 102, 104, 108 may be deformed slightly to allow the first connector portions 118 to be brought into mating engagement with respective second connector portions 120, thereby establishing a snap fit between the channels 102, 104, 108. Once the channels 102, 104, 108 are connected via the snap fit connection, the flanges 114a, 114b of the third channel 108 may be flexed away from the corresponding flanges 114c, 114d of the first and second channels 102, 104, thereby separating the mated first and second connector portions 118, 120 and allowing release of the connectors 106. To this end, in one embodiment, the outward flare of the distal edges 116 of each of the flanges 114a, 114b allows placement of an object, such as a prying tool, between the flanges 114a, 114b of the third channel 108 and the corresponding flanges 114c, 114d of the first and second channels 102, 104 to facilitate prying separation of the third channel 108 from the first and/or second channels 102, 104.

While the illustrated embodiment of FIGS. 1-4 depicts each first connector portion 118 as being defined along each of the first and second channels 102, 104, and each second connector portion 120 as being defined along the third channel 108, it will be recognized that the positional relationship of these elements may be reversed without departing from the spirit and scope of the present general inventive concept. Furthermore, it will be recognized that the flanges 114a, 114b of the third channel 108 may, in certain embodiments, be configured to snap fit along an interior of the flanges 114c, 114d of the first and second channels 102, 104. To this end, in several embodiments, the flanges 114c, 114d of the first and second channels 102, 104 may define inwardly-facing first connector portions 118 to be received by second connector portions 120 defined along the flanges 114a, 114b of the third channel 108. Those of skill in the art will recognize numerous other configurations for the above-discussed system 100 which may be used without departing from the spirit and scope of the present general inventive concept.

It will further be recognized by one of skill in the art that the above-described snap fit connection is an effective device to allow a fastening system for speedy and precise assembly of a structure, such as a frame or modular construction. The snap fit connection may be designed to offer parts to be permanently fastened, to be pre-determined to be broken off, or to be frequent assembled and disassembled. Exemplary snap fit connectors may include one or more of the following: tongue and groove, hole, hollow, mortise, cutout, notch opening, orifice, groove, cutout, etc.

Figure 5:
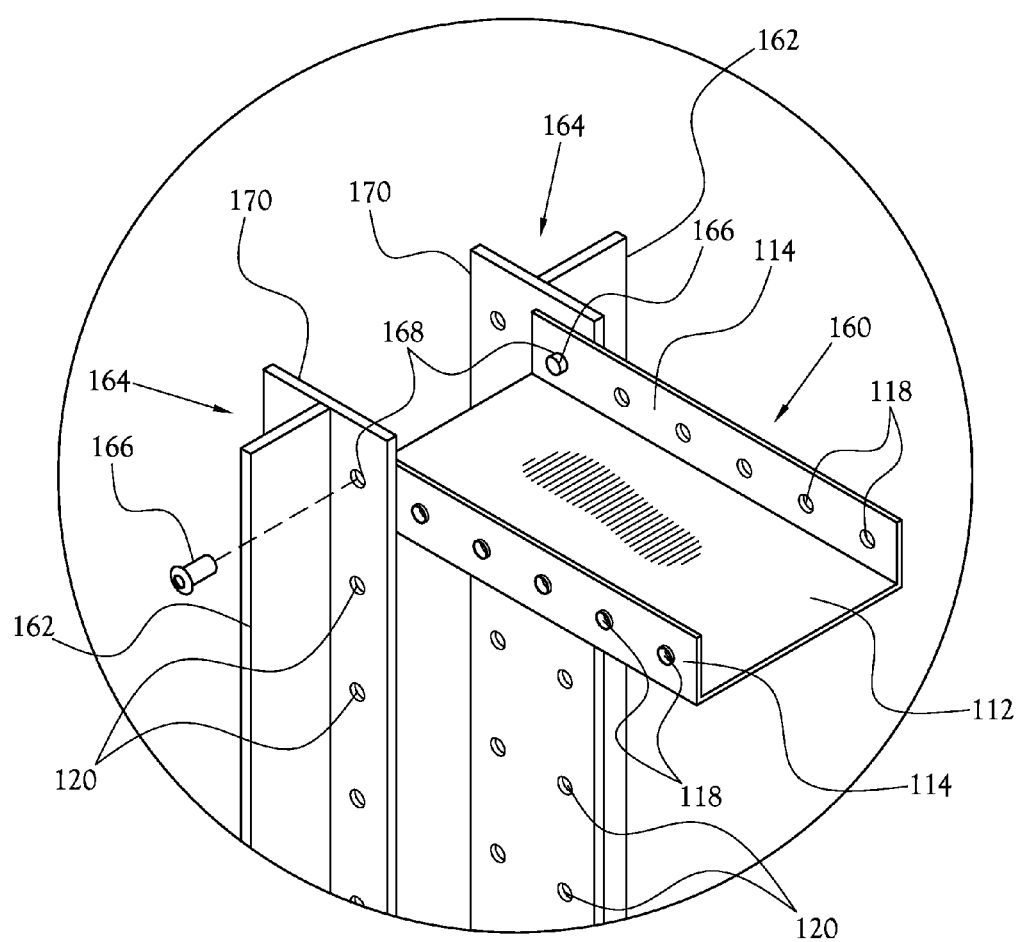
FIG. 5 is a perspective view of a frame construction incorporating one embodiment of the quick attachment system for modular construction according to several features of the present general inventive concept.

FIG. 5 is an illustration of an exemplary embodiment of a frame construction incorporating one embodiment of the system 100 according to several features of the present general inventive concept. In the illustrated embodiment, a U-shaped channel segment 160 is provided to join two vertical uprights 164 in a spaced apart relationship to one another, such that the vertical uprights 164 may be further used, for example to construct a modular construction, such as a wall, partition, or other such construction. In several embodiments, the vertical uprights 164 define at least one attachment leg having attachment means defined thereon, and at least one stiffening leg providing rigid support to the vertical uprights 164. For example, in the illustrated embodiment, the vertical uprights are defined by T-shaped channels 164 held in a spaced-apart relationship to one another along respective top flanges 170 of the T-shaped channels. More specifically, in the illustrated embodiment, the two T-shaped channels 164 are arranged in substantially parallel and spaced apart relationship, with respective top flanges 170 of the T-shaped channels 164 facing one another. In the illustrated embodiment, a plurality of connector second portions 120 are defined at spaced apart locations along each top flange 170 of each T-shaped channel 164. The U-shaped channel segment 160 is interposed and extends between the top flanges 170 of the T-shaped channels 164, with each flange 114 of the segment 160 positioned adjacent a respective top flange 170 of a corresponding channel 164. Each T-shaped channel 164 further defines an outwardly extending web 162 which provides rigid support to the T-shaped channel 164. In several embodiments, the web 162 may define additional connector elements (not shown) to assist in securing additional structural elements, such as wall panels, shelving, or the like, along the frame construction between adjacent webs 162.

In the illustrated embodiment, the segment 160 defines a plurality of first connector portions 118 disposed at spaced apart locations along each flange 114. Each first connector portion 118 is positioned along a respective flange 114 of the segment 160 such that each first connector portion 118 may mate with and engage a second connector portion 120 of a corresponding channel top flange 170. In the illustrated embodiment, a pair of fasteners 166, such as pop rivet assemblies, are secured through a respective pair of axially-aligned connectors 168 of the channels 164 and segment 160, such that the channels 164 and segment 160 are rotatably joined about the fasteners 166 and axially-aligned connectors 168. Thus, in the illustrated embodiment, the segment 160 may be rotated to a position substantially parallel with the channels 164, such that each first connector portion 118 of the segment 160 may mate with and engage a second connector portion 120 of a corresponding channel top flange 170. The segment may also be rotated to a position non-parallel with the channels 164, such that one or more first connector portions 118 of the segment 160 may be accessed to facilitate connection of additional members to the segment 160.

Figure 6:
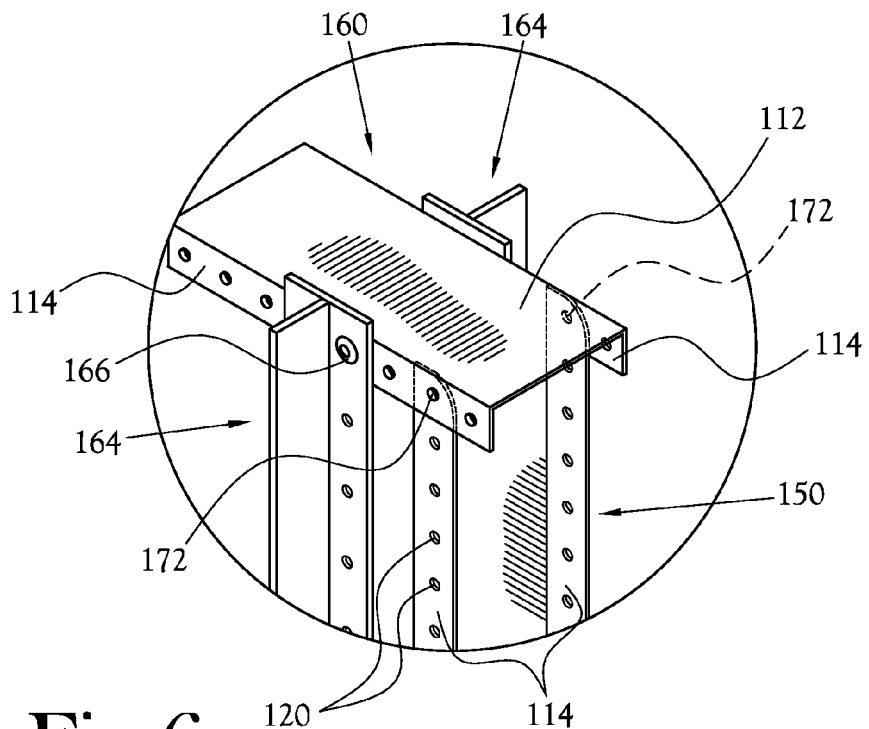
FIG. 6 is a perspective view of another frame construction incorporating one embodiment of the quick attachment system for modular construction according to several features of the present general inventive concept.
Figure 7:
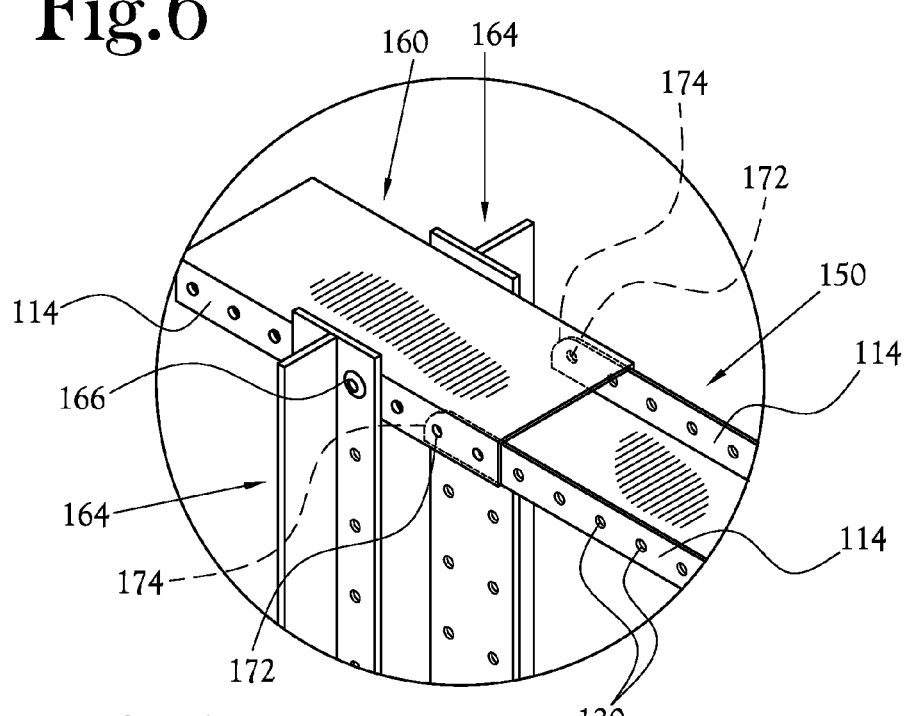
FIG. 7 is a perspective view of the frame construction of FIG. 6, showing the frame construction in an extended position.

Another exemplary embodiment is illustrated in FIGS. 6 and 7, wherein a segment 160 is provided to join a pair of opposing T-shaped channels 164 at a central location of the segment 160. In this embodiment, the segment 160 extends generally perpendicularly to the T-shaped channels 164, with respective flanges 114 of the segment 160 extending generally downwardly from the web 112 of the segment 160. As discussed above, fasteners 166 are provided in conjunction with respective mating connectors 106 to secure the segment 160 perpendicularly in relation to the T-shaped channels 164.

In the illustrated embodiment, an additional channel 150 is joined via associated mating connectors 106 proximate a distal end of the segment 160. More specifically, in the illustrated embodiment, a channel 150 is provided defining a plurality of second connector portions 120 which are spaced along associated flanges 114 of the channel 150 at spaced apart locations, such that the second connector portions 120 of the channel 150 may mate with and engage one or more of the first connector portions 118 defined along the segment 160. In the illustrated embodiment, an end pair 172 of second connector portions 120 located at an end of the channel 150 are mated with a pair of first connector portions 118 interior of a distal end of the segment 160, such that the channel 150 may be rotated between a collapsed position (see FIG. 6), in which the channel 150 extends generally along, and in some embodiments parallel to, a length of the T-shaped channels 164, and an extended position (see FIG. 7), in which the channel 150 extends generally parallel to the segment 160.

Referring to FIG. 7, it will be recognized that, in the present exemplary embodiment, when the channel 150 is rotated to the extended position, a plurality of second connector portions 120 of the channel 150 may mate with and engage a plurality of first connector portions 118 of the segment 160, such that the mated connectors 106 of the segment 160 and channel 150 cooperate to lock the channel 150 in the extended position in relation to the segment 160 to provide a more secure and permanent attachment of the segment 160 with the channel 150. In certain embodiments, one or more of the channel 150 and the segment 160 may have flanges 114 defining rounded corners 174 to facilitate rotation of the channel 150 with respect to the segment 160 between the collapsed and extended positions. In particular, in embodiments in which one flange 114 is positioned interior of another, such rounded corners 174 may allow rotation of the interior flange 114 in relation to an adjacent exterior flange of an adjacent exterior member absent impingement upon the interior flange 114 by the exterior member. However, it will be recognized that such rounded corners 174 are not necessary in all embodiments to accomplish a rotatable and lockable connection pursuant to the present general inventive concept.

Figure 8:
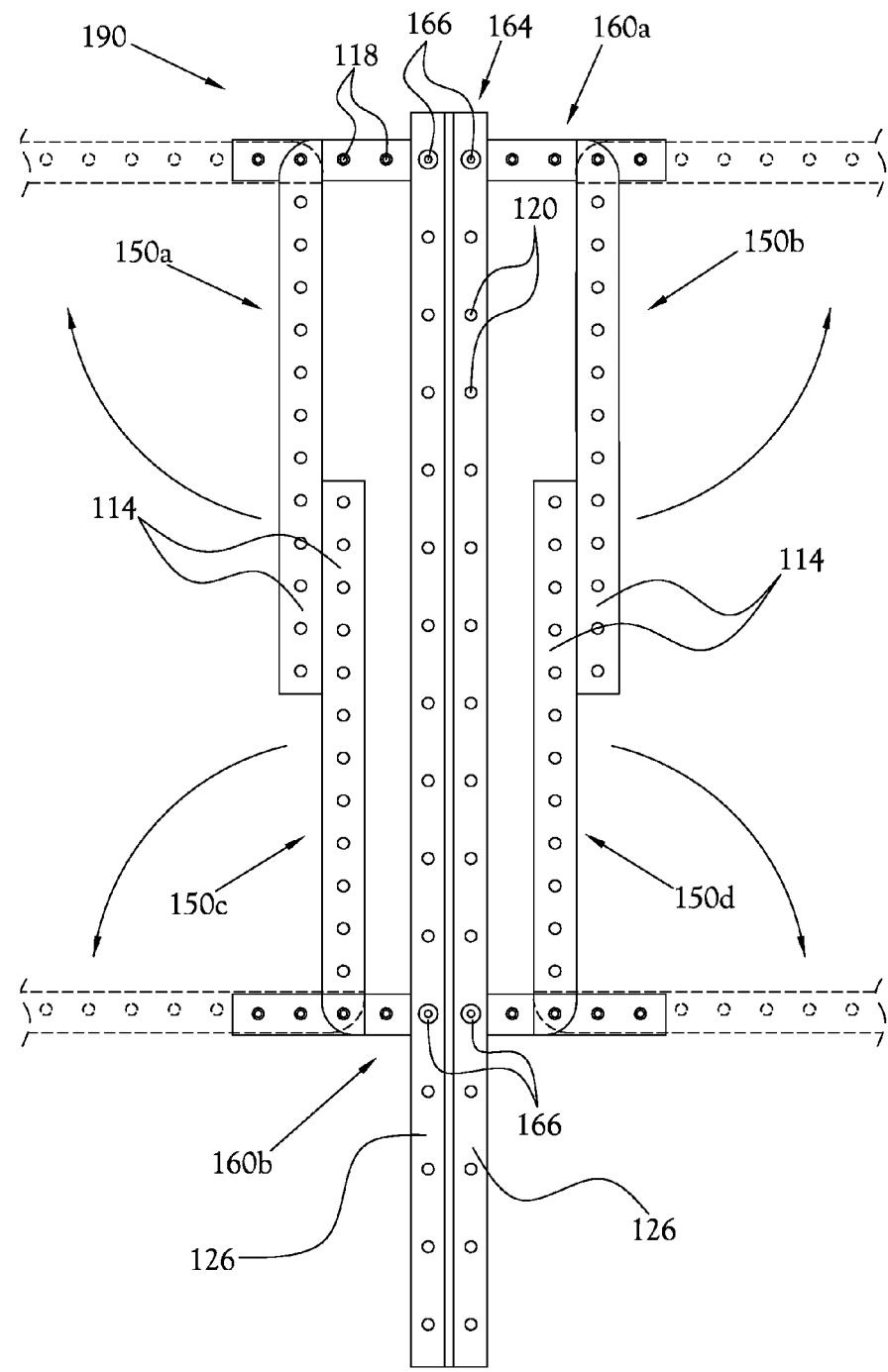
FIG. 8 is a front elevation view of a modular frame unit incorporating one embodiment of the quick attachment system for modular construction according to several features of the present general inventive concept.

Referring now to FIG. 8, in accordance with several features of the present general inventive concept, the system 100 may be incorporated into a modular frame unit 190 which is selectively foldable between a collapsed position (shown in solid lines in FIG. 8), and an extended and locked position (shown in phantom lines in FIG. 8). In the embodiment of FIG. 8, two T-shaped channels 164 are arranged in substantially parallel and spaced apart relationship, with respective top flanges 170 of the T-shaped channels 164 facing one another. While the illustrated embodiment depicts the T-shaped channels 164 in substantially overlying relationship, i.e., with respective top flanges 170 of the T-shaped channels 164 facing one another, it will be understood that such overlying relationship is not necessary to accomplish the present general inventive concept. For example, in several embodiments, a plurality of T-shaped channels 164 may be provided in a staggered and spaced apart configuration.

In the illustrated embodiment, a plurality of connector second portions 120 are defined at spaced apart locations along each opposite elongated side 126 of each top flange 170 of each T-shaped channel 164. In this embodiment, a pair of U-shaped channel segments 160a, 160b are interposed between the top flanges 170 of the T-shaped channels 164 at spaced apart locations along the T-shaped channels 164. Each flange 114 of the segments 160a, 160b includes two first connector portions 118 mated with and engaging respective adjacent second connector portions 120 of respective top flanges 170 of the T-shaped channels 164, such that the U-shaped channel segments 160a, 160b extend perpendicular to the T-shaped channels 164 and cooperate to maintain the T-shaped channels 164 in a substantially parallel, spaced apart relationship to one another. In the illustrated embodiment, suitable fasteners 166 are provided through each mated connector 106 between the T-shaped channels 164 and the U-shaped channel segments 160a, 160b to further fix the U-shaped channel segments 160a, 160b in relation to the T-shaped channels 164.

In the illustrated embodiment of FIG. 8, a plurality of channels 150a-150d are provided, with each channel 150a-150d being rotatably connected to a respective end of one of the U-shaped channel segments 160a-160b in a manner similar to the connection systems illustrated in FIGS. 6 and 7. In the embodiment of FIG. 8, each of the channels 150a-150d may be rotated between a collapsed position, wherein the channels 150a-150d are generally parallel to the T-shaped channels 164, and an extended and locked position, wherein the channels 150a-150d are generally perpendicular (shown in phantom) to the T-shaped channels 164. In the illustrated embodiment, each upper channel 150a, 150b is rotatably connected to an upper one of the segments 160a at a first location inwardly from respective ends of the upper segment 160a. Each lower channel 150c, 150d is rotatably connected to a lower one of the segments 160b at a second location further inwardly from respective ends of the lower segment 160b than the first location. Thus, in the collapsed position, each of the lower channels 150c, 150d is configured to nest along the T-shaped channels 164 inwardly of the upper channels 150a, 150d. As discussed above, rotation of the channels 150a-150d from the collapsed position to the extended position may align and mate a plurality of second connector portions 120 of each channel 150a-150d with corresponding first connector portions 118 of a corresponding segment 160, such that the channel 150a-150d is locked in the extended position.

Similarly to the embodiment of FIGS. 1 and 2 discussed above, in certain embodiments (not shown), the various flanges 114 of the channels 150a-150d may define outwardly flared edges to facilitate more convenient locking and/or unlocking of the channels 150a-150d in the extended position. However, it will be recognized that inclusion of such outwardly flared edges is not required to accomplish the modular frame unit 190 of the present general inventive concept.

Figure 9:
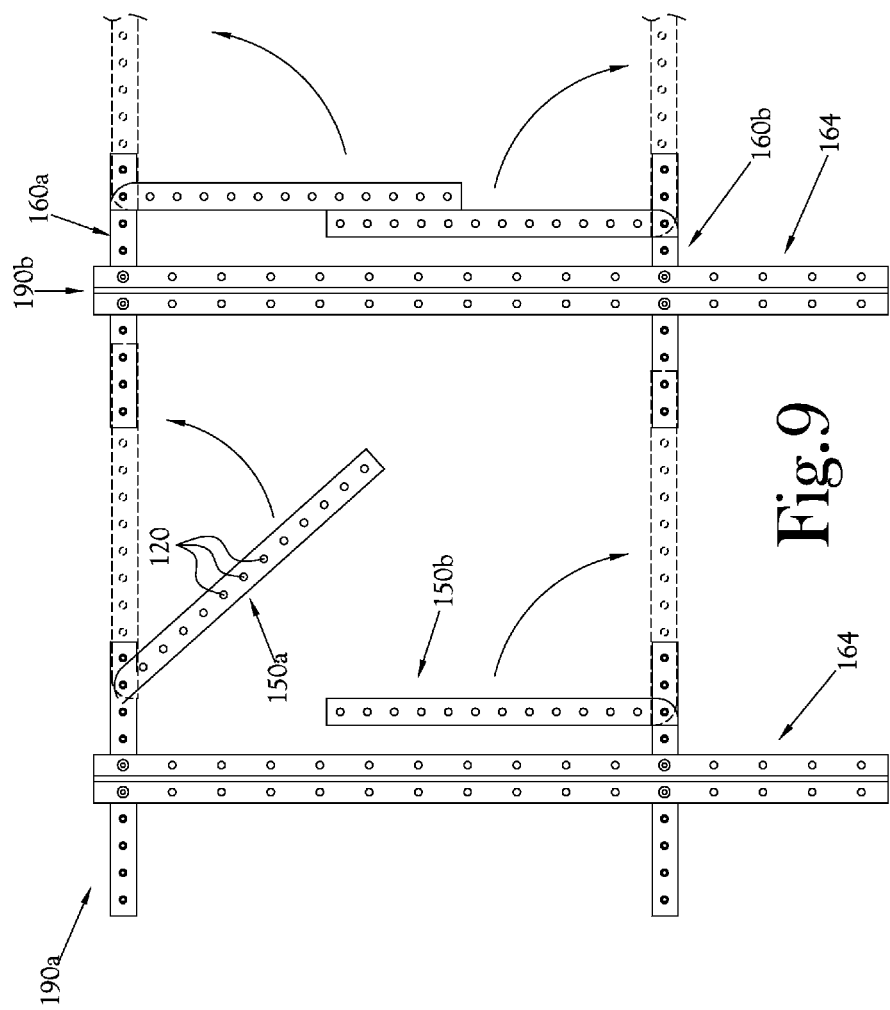
FIG. 9 is a front elevation view of another modular frame unit incorporating one embodiment of the quick attachment system for modular construction according to several features of the present general inventive concept modular connection system after joinder.

FIG. 9 illustrates an exemplary embodiment wherein a plurality of modular frame units 190a, 190b may be connected at precise distances to one another in a manner similar to the embodiments illustrated in FIGS. 1-7. As shown in FIG. 9, channels 150a-150b of a first modular frame unit 190a may be rotated from a collapsed position, wherein the channels are folded along the T-shaped channels 164, to an extended position, wherein the channels are generally perpendicular (shown in phantom) to the T-shaped channels 164. In the extended position, channels 150a-150b of the first modular frame unit 190 a may be joined, via connector portions 120 defined at precise locations along each of the channels 150a-150b of the first modular frame unit 190a, to corresponding U-shaped channel segments 160a, 160b of an adjacent second modular connection system 190b. Thus, a plurality of modular frame units 190a, 190b may be joined or constructed into a larger modular framing system that is relatively speedy and simple to assemble and/or construct, and which may be constructed to precise dimensions corresponding with the locations of the various connector portions 118, 120 along the channels 150a-150b and channel segments 160a, 160b.

In an exemplary embodiment, a plurality of smaller or compact modular frame units 190a, 190b may be preassembled in a first location and configured in a collapsed position for easy storage and/or transportation. The modular frame units 190a, 190b may be reconfigured in an extended position and joined with one another and/or other modular frame units 190a, 190b in a second location to facilitate a relatively convenient and simple assembly and transportation system for building larger construction systems that may be utilized for larger operations. Example applications include, but are not limited to, fabrication of temporary or semi-permanent walls or shelves, scaffolding, framing, and the like.

Figure 10:
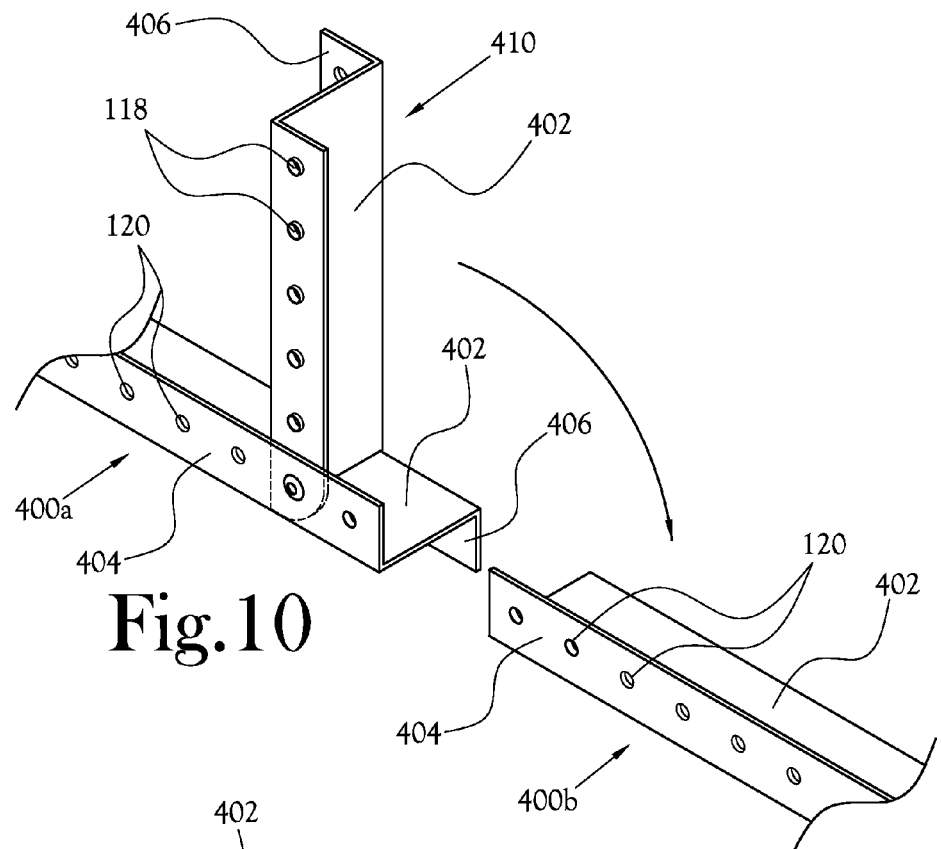
FIG. 10 is a perspective view of another embodiment of a quick attachment system for modular construction according to several features of the present general inventive concept.
Figure 11:
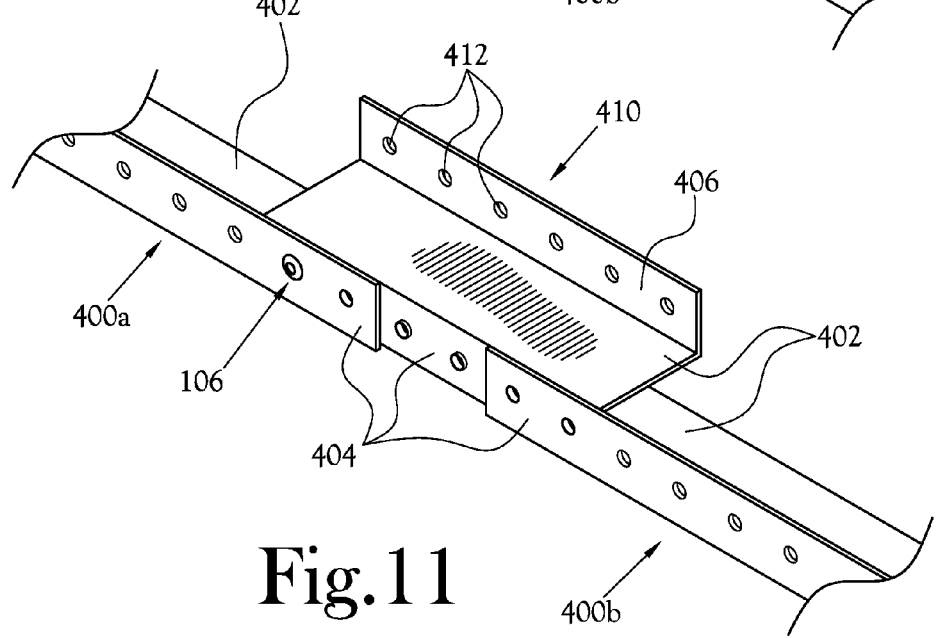
FIG. 11 is a perspective view of the quick attachment system for modular construction of FIG. 10.

FIGS. 10 and 11 illustrate an exemplary embodiment wherein a first and second Z-shaped members 400a, 400b are joined together via a third Z-shaped member 410. In the illustrated embodiment, first and second Z-shaped members 400a, 400b provided in a generally parallel, collinear and spaced apart configuration. Each of the Z-shaped members 400a, 400b, 410 defines a central web 402, a first flange 404 extending perpendicularly to the central web 402 along a first edge thereof, and a second flange 406 extending perpendicularly to the central web 402 along a second edge thereof in a direction opposite the first flange 404. In the illustrated embodiment, each first flange 404 of each of the first and second Z-shaped members 400a, 400b defines a plurality of second connector portions 120 at spaced apart locations along a length thereof. The first flange 404 of the third Z-shaped member 410 defines a plurality of first connector portions 118 at locations along the length thereof such that the first connector portions 118 of the third Z-shaped member 410 may mate with and engage one or more of the second connector portions 120 of the first and second Z-shaped members 400a, 400b to establish a face to face generally flush mechanical connection between the respective first flanges 404 of the first, second, and third Z-shaped members 400a, 400b, 410. In the illustrated embodiment, each of the second flanges 406 of the first, second, and third Z-shaped members 400a, 400b, 410 define additional connector portions 412, such that the second flanges 406 of the first, second, and third Z-shaped members 400a, 400b, 410 may each be secured to an additional structure, such as for example a wall, frame, or like structure. Thus, the mating connection of the first, second, and third Z-shaped members 400a, 400b, 410 establishes a fixed, end-to-end connection of the first and second Z-shaped members in relation to one another.

Referring to FIGS. 10 and 11, in accordance with several embodiments of the present general inventive concept, the third Z-shaped member 410 may be first attached to a first Z-shaped member 400b and rotated into position to connect a second Z-shaped member 400a, which may make a generally straight alignment of a plurality of channels. Thereafter, the second flanges 406 of the first, second, and third Z-shaped members 400a, 400b, 410 may each be secured to an additional structure as discussed above to further secure the connection between the first, second, and third Z-shaped members 400a, 400b, 410.

In the illustrated embodiments of FIGS. 1-11, each of the connectors 106 is depicted as embodying the above-discussed first connector portion 118 comprising a circular hole having an annular, flared lip 130 protruding outwardly therefrom and a second connector portion 120 comprising an opening sized and shaped to receive the annular lip 130 of the first connector portion 118. However, it is not the intention of the Applicant to limit the connectors 106 of the present general inventive concept to this configuration. To this end, FIGS. 12a-12d illustrate several additional exemplary embodiments of structures suitable to form a connector 106 of the present general inventive concept. As shown in FIG. 12a, in certain embodiments, the second connector portion 120 may comprise generally a hole 460 defining a generally polygonal shape, such as for example the illustrated rectangular hole. As shown in FIGS. 12b and 12c, the rectangular or square hole 460 may be configured to receive a first connector portion 118 comprising a generally triangular extension or protrusion 468 (FIG. 12b), or a generally rectangular tab 470 flared outwardly from a surface (FIG. 12c). FIG. 12d illustrates an exemplary embodiment of a first connector portion 118 utilizing a generally elliptical or oblong protrusion 474. Those of skill in the art will recognize numerous additional configurations suitable for forming the connector 106, and such additional configurations may be used without departing from the spirit and scope of the present general inventive concept.

Figure 13:
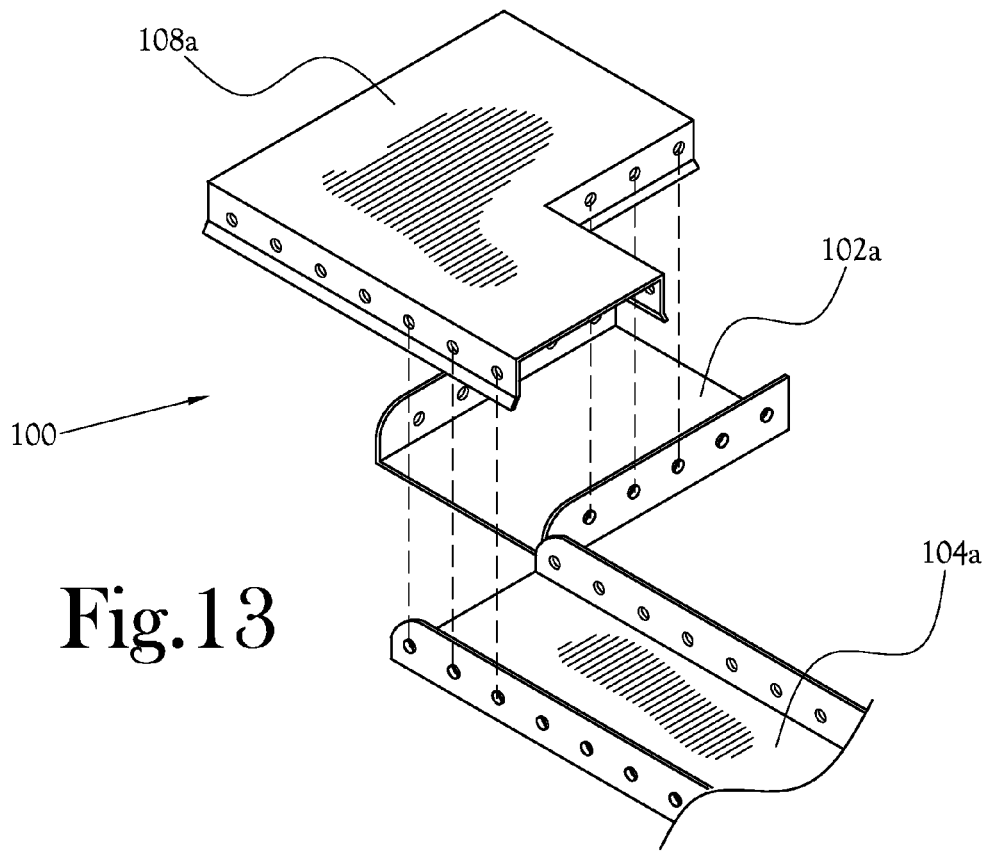
FIG. 13 is a partially exploded perspective view of another embodiment of a quick attachment system for modular construction according to several features of the present general inventive concept.
Figure 14:
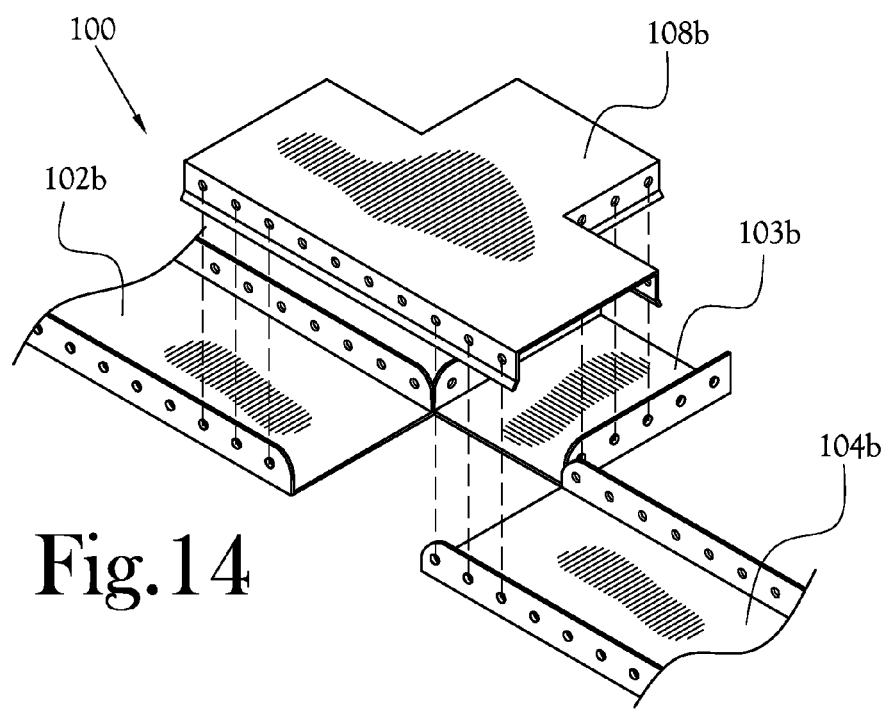
FIG. 14 is a partially exploded perspective view of another embodiment of a quick attachment system for modular construction according to several features of the present general inventive concept.
Figure 15:
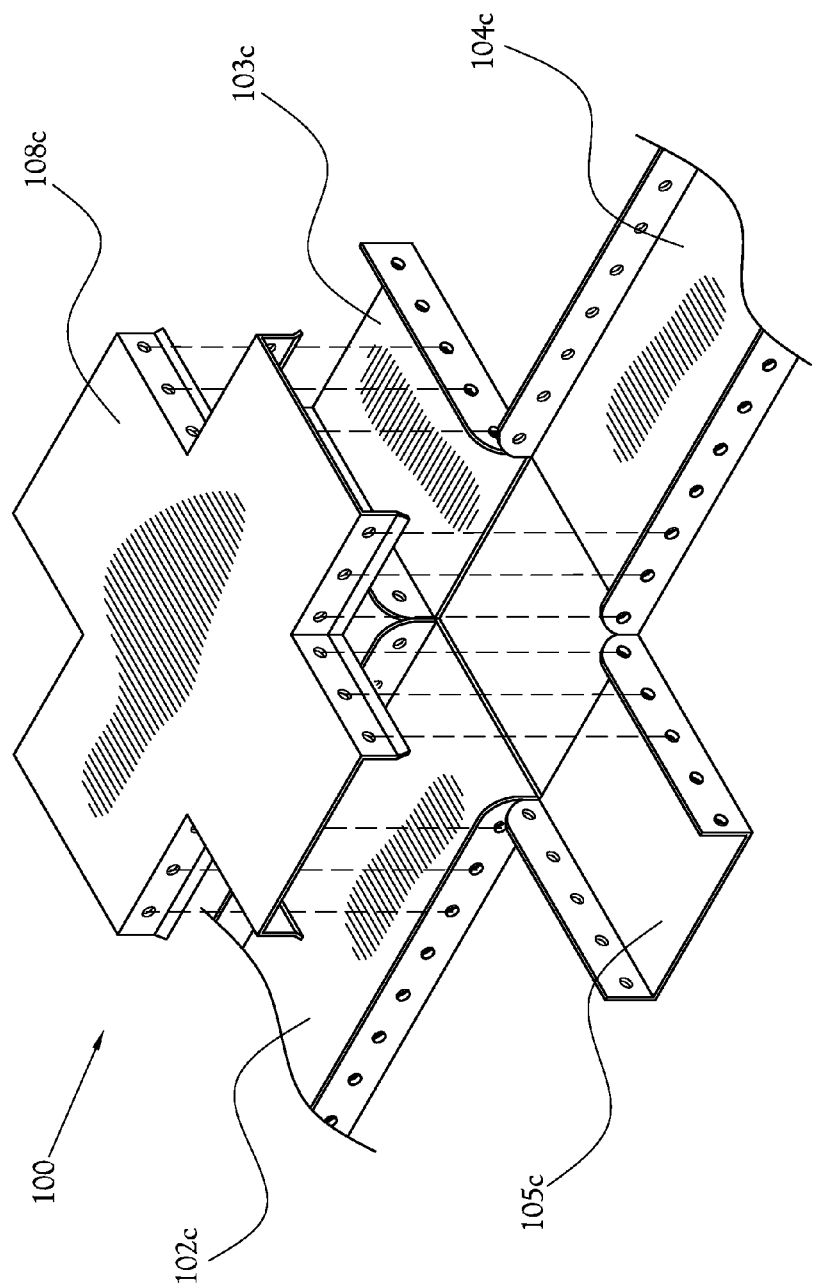
FIG. 15 is a partially exploded perspective view of another embodiment of a quick attachment system for modular construction according to several features of the present general inventive concept.

In the illustrated embodiments of FIGS. 1-11, each of the channels 102, 104, 108 and channel segments 150, 160 is depicted as being a substantially straight member, and each of the above-discussed members is depicted as being joined to form a substantially collinear and end-to-end joinder of the various channels 102, 104, 108, and channel segments 150, 160. However, it is not the intention of the applicant to limit the present general inventive concept to such configurations. To this end, FIGS. 13-15 illustrate additional example embodiments of the quick attachment system 100, in which a plurality of channels are joined in a non-linear configuration. For example, in the embodiment of FIG. 13, first and second rigid, elongated channel segments 102a, 104a are provided in a substantially orthogonal configuration to be joined by a third channel 108a. The third channel 108a defines a bend 210, such that each end of the third channel 108a may mate with a respective one of the channel segments 102a, 104a to join the channel segments 102a, 104a in an angled configuration. In the embodiment of FIG. 14, three channel segments 102b, 103b, 104b are provided, with each of the three channel segments 102b, 103b, 104b defining respective first connector portions 118 along respective flanges thereof. In this embodiment, each of the three channel segments 102b, 103b, 104b is configured orthogonally to an adjacent channel segment, such that the channel segments 102b, 103b, 104b define a T-shaped configuration. In this embodiment, a forth channel 108b is provided defining a T-shaped configuration, such that each of three ends of the fourth channel 108b may mate with a respective one of the channel segments 102b, 103b, 104b to join the channel segments 102b, 103b, 104b in a T-shaped configuration. In the embodiment of FIG. 15, four channel segments 102c, 103c, 104c, 105c are provided, with each of the four channel segments 102c, 103c, 104c, 105c defining respective first connector portions 118 along respective flanges thereof. In this embodiment, each of the four channel segments 102c, 103c, 104c, 105c is configured orthogonally to an adjacent channel segment, such that the channel segments 102c, 103c, 104c, 105c define a four-directional configuration. In this embodiment, a fifth channel 108c is provided defining a matching four-directional configuration, such that each of four ends of the fifth channel 108c may mate with a respective one of the channel segments 102c, 103c, 104c, 105c to join the channel segments 102c, 103c, 104c, 105c in a four-directional configuration. It will be recognized by one of skill in the art that numerous other configurations exist by which the quick attachment system 100 may be used to join various members in a desired shape, and such other configurations may be used without departing from the spirit and scope of the present general inventive concept.

Figure 16:
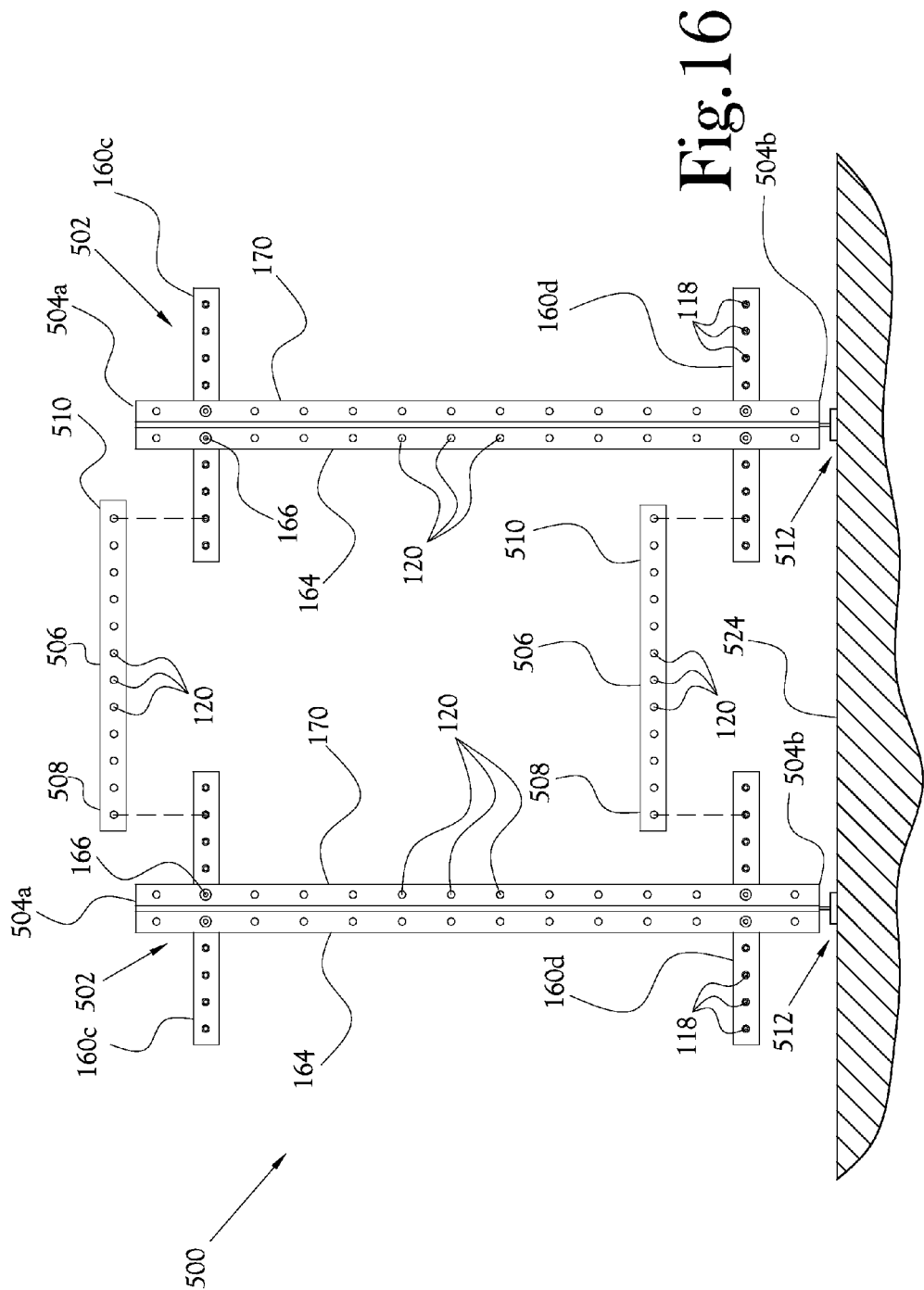
FIG. 16 is a partially exploded front elevation view of another embodiment of a modular frame system incorporating one embodiment of the quick attachment system for modular construction according to several features of the present general inventive concept.

FIG. 16 illustrates another example embodiment of a modular frame system 500 constructed in accordance with several features of the present general inventive concept. In the embodiment of FIG. 16, a plurality of modular frame units 502 are provided. Each modular frame unit 502 comprises a pair of T-shaped channels 164 arranged in substantially parallel and spaced apart relationship, with respective top flanges 170 of the T-shaped channels 164 facing one another. As in the embodiments discussed above, a plurality of connector second portions 120 are provided at spaced apart locations along each opposite elongated side 126 of each top flange 170 of each T-shaped channel 164. A pair of U-shaped channel segments 160c, 160d are interposed between the top flanges 170 of the T-shaped channels 164, such that each U-shaped channel segment 160c, 160d extends generally perpendicular to the long dimension of the T-shaped channels 164. Each flange 114 of the segments 160c, 160d is adjacent a respective one of the top flanges 170 of the T-shaped channels 164, and each flange 114 defines a plurality of first connector portions 118 along respective lengths thereof. Two of the first connector portions 118 of each flange 114 are mated with and engage respective adjacent second connector portions 120 of respective top flanges 170 of the T-shaped channels 164, such that the long dimensions of the U-shaped channel segments 160a, 160b extend perpendicular to the T-shaped channels 164 and cooperate to maintain the T-shaped channels 164 in a substantially parallel, spaced apart relationship to one another. In the illustrated embodiment, suitable fasteners 166 are provided through each mated connector 106 between the T-shaped channels 164 and the U-shaped channel segments 160c, 160d to further fix the U-shaped channel segments 160c, 160d in relation to the T-shaped channels 164.

In the present embodiment, each flange 114 of each U-shaped channel segment 160c, 160d extends substantially upward from a respective web 112 of the U-shaped channel segment 160c, 160d, toward an upper end 504a of the T-shaped channels 164. Furthermore, each U-shaped channel segment 160c, 160d is offset inward along the long dimension of the T-shaped channels 164 from a respective end 504 of the T-shaped channels 164. More specifically, in various embodiments, each modular frame unit 502 includes an upper U-shaped channel segment 160c which is offset along the long dimension of the T-shaped channels 164 from an upper end 504a of the T-shaped channels 164 by a distance of between approximately one to six inches. Likewise, each modular frame unit 502 includes a lower U-shaped channel segment 160d which is offset along the long dimension of the T-shaped channels 164 from a lower end 504b of the T-shaped channels 164 by a distance of between approximately one to six inches.

In the illustrated embodiment of FIG. 16, a plurality of joinder channels 506 are provided, with each joinder channel 506 having respective flanges 114 defining a plurality of second connector portions 120 along respective lengths thereof. Thus, each joinder channel 506 may be oriented such that the respective flanges 114 of the joinder channel 506 extend from the web 112 thereof downward toward the lower end 504b of the T-shaped channels 164, whereupon each of opposite first and second ends 508, 510 of each joinder channel 506 are connectable to a respective end of one of the U-shaped channel segments 160c, 160d by mating a plurality of the second connector portions 120 along each end 508, 510 of each joinder channel 506 with corresponding first connector portions 120 along the corresponding end of the corresponding U-shaped channel segment 160c, 160d. In this manner, each of the plurality of modular frame units 502 may be joined to one another to form a substantially rigid modular frame system 500 which is capable, for example, of forming a support structure for a wall surface or other fixture.

In a preferred embodiment, each joinder channel 506 is approximately 34 inches long, and each of the first and second connector portions 118, 120 defined along the respective joinder channels 506 and U-shaped channel segments 160c, 160d are spaced approximately one inch apart along respective longitudinal dimensions of the channels 506 and segments 160c, 160d. Thus, in the preferred embodiment, each pair of T-shaped channels 164 of each modular frame unit 502 is capable of being joined in relation to one another via corresponding upper and lower U-shaped channel segments 160c, 160d using associated joinder channels 506, such that a modular frame system 500 is formed, and furthermore, the distance of the separation of respective pairs of T-shaped shaped channels 164 may be adjusted in relation to one another in approximate one-inch increments of space.

Figure 17:
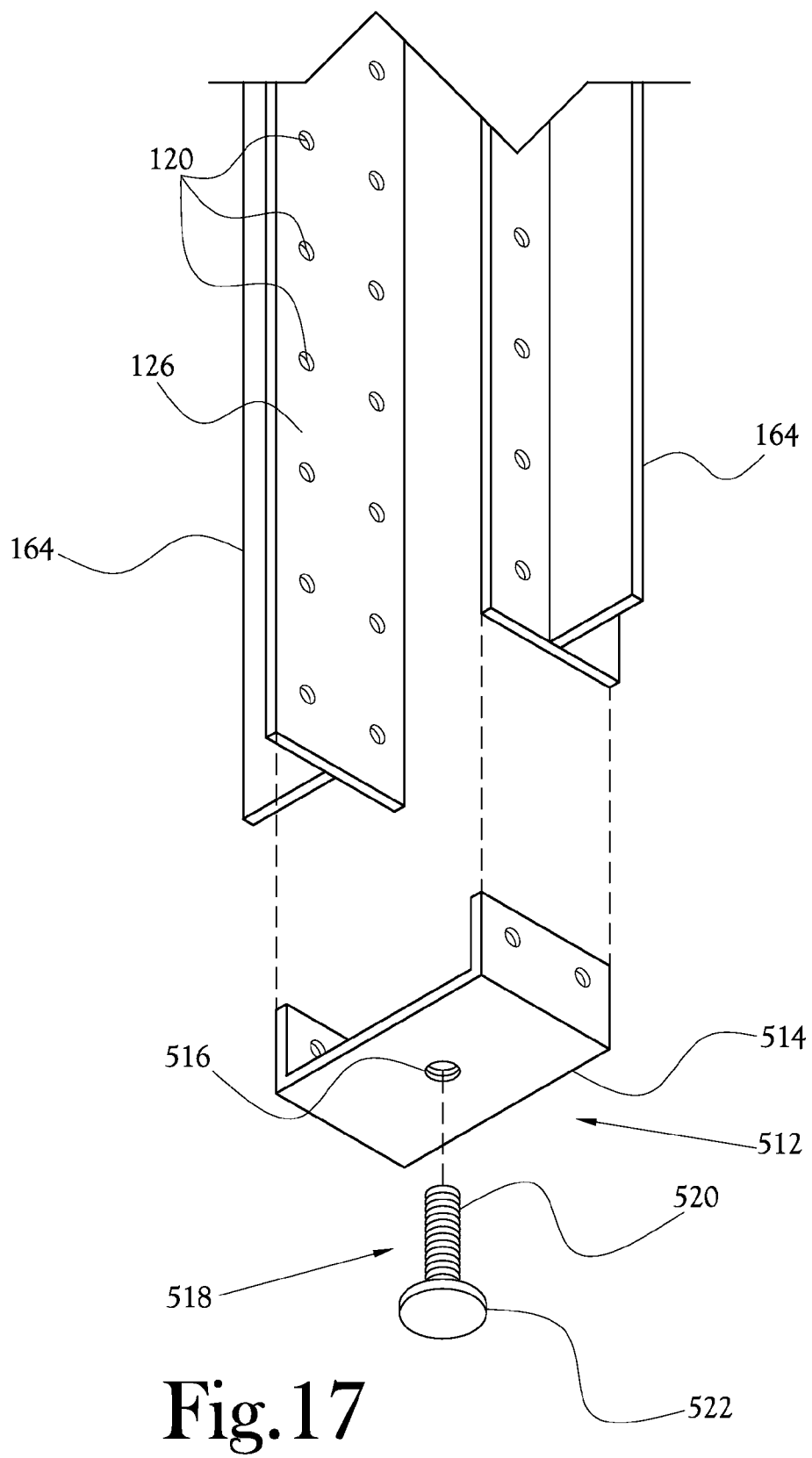
FIG. 17 is a partially exploded partial perspective view showing the leveling device portion of the modular frame system of FIG. 16.

In various embodiments, each modular frame unit 502 further comprises a leveling device 512 positioned at a lower end 504b of each pair of T-shaped channels 164. For example, and with reference to FIG. 17, in one example embodiment, a leveling device 512 is provided which includes a mounting bracket 514 interposed between the top flanges 170 of the T-shaped channels 164 at the lower end 504b of the T-shaped channels 164 of the modular frame unit 502. The mounting bracket 514 defines an internally threaded bore 516 extending axially along the long dimension of the T-shaped channels 164. A leveling foot 518 is provided having a pad 522 and an elongated, externally threaded shaft 520 sized and shaped to be threadably received within the bore 516. The pad 522 is configured to bear the weight of the modular frame unit 502 to a supporting surface 524, such as the floor or ground. Thus, the distance of separation between the pad 522 and the mounting block 514, and thus, the overall height of the lower end 504b of the T-shaped channels 164 from the supporting surface 524, may be adjusted by means of threading the shaft 520 into and out from the bore 516.

It will be recognized that the above-discussed leveling device 512, as well as the offset of each U-shaped channel segment 160c, 160d from a respective end 504 of the T-shaped channels 164, provides several unique advantages over the known prior art. For example, it will be recognized that the leveling device 512 allows for at least some adjustment of the overall height of the modular frame unit 502. To this end, in one application of the present embodiment of the modular frame system 500, a plurality of modular frame units 502 may be provided, each of which extends slightly less than the distance between the floor 524 and the ceiling (not shown) of a room into which the modular frame system 500 is to be installed. In such an application, each modular frame unit 502 may be positioned within the room, whereupon each leveling device 512 may be adjusted to position each upper end 504a of each pair of T-shaped channels 164 substantially adjacent the ceiling, and also to align each channel segment 160c, 160d of each modular frame unit 502 substantially horizontally with a corresponding channel segment 160c, 160d of an adjacent modular frame unit 502. Thereafter, the offset of each upper channel segment 160c from each upper end 504a of the T-shaped channels 164 allows sufficient space for each joinder channel 506 to be positioned above corresponding upper channel segments 160c of adjacent modular frame units 502 and thereafter secured to respective ends of the U-shaped channel segments 160c. Likewise, the offset of each lower channel segment 160d from each lower end 504b of the T-shaped channels 164 allows sufficient space for additional adjustment of the leveling device 512 absent the need to remove or reposition the lower channel segments 160d or corresponding joinder channels 506.

It will further be recognized that the quick attachment system 100 employed in various embodiments of the modular frame system 500 provides several unique advantages over the known prior art. Specifically, in several embodiments, at least two second connector portions 120 of each flange 114 of each joinder channel end 508, 510 are mated with corresponding first connector portions 118 of corresponding channel segments 160c, 160d. Thus, the various mated first and second connector portions 118, 120 cooperate to establish multiple points of connection along the longitudinal dimension of each joined channel segment 160 and joinder channel 506. It will be recognized that such multiple connection points along the longitudinal dimension of the joined channel segments 160 and joinder channels 506 provides improved rigidity to the assembled modular frame system 500. Furthermore, it will be recognized that the quick attachment systems 100 employed in the modular frame system 500 allow the modular frame system 500 to be assembled and disassembled relatively quickly and easily as compared to various prior art systems.

Figure 18:
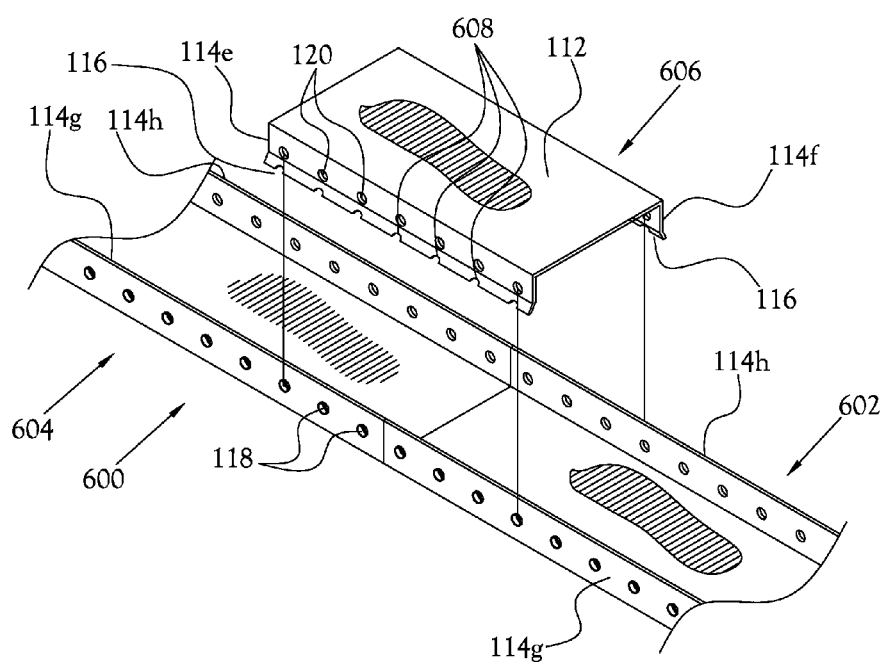
FIG. 18 is a partially exploded perspective view of another embodiment of a quick attachment system for modular construction according to several features of the present general inventive concept.

FIG. 18 illustrates another embodiment of a quick attachment system 600 constructed in accordance with several features of the present general inventive concept. Similar to the above-discussed embodiments, in the embodiment of FIG. 18, each of the flanges 114e, 114f of the third channel 606 surrounding the flanges 114g, 114h of the first and second channels 602, 604 defines an outwardly flared distal edge 116. However, in the embodiment of FIG. 18, each of the distal edges 116 of the flanges 114e, 114f of the third channel 606 further defines a series of indexing recesses 608 disposed along a length of the distal edge 116. More specifically, in the illustrated embodiment, one recess 608 is provided for each of the second connector portions 120 along the length of each of the flanges 114e, 114f of the third channel 606. Each recess 608 is aligned laterally outwardly along the corresponding flange 114e, 114f with a corresponding second connector portion 120. Thus, as the third channel 606 is brought in overlying relationship with the first and second channels 602, 604, each recess 608 may be brought into registration with a corresponding one of the first connector portions 118 along the flanges 114g, 114h of the first and second channels 602, 604. In this manner, the recesses 608 serve to assist in aligning each second connector portion 120 of the third channel 606 with a corresponding first connector portion 118 of the first and second channels 602, 604. Thus, the various corresponding first and second connector portions 118, 120 may be more easily joined to accomplish connection of the first, second, and third channels 602, 604, 606.

Exemplary embodiments herein contemplate construction materials of a sturdy nature, such as metal, plastic, thermoplastics, rubber, wood, composites thereof, etc. Exemplary fabrication techniques comprise stamping, molding, extruding, machining, cutting, casting, etc. Exemplary fasteners may include a screw, strut, tang, tine, tongue, track, trace, annulus (ring arm), arbor (shaft), boss (projection), boule (pear-shaped), bougie (body-insertion member), detent, flute (groove on shaft), fillet (narrow strip), fin finger, screw, grommet, gusset, (triangular insert) hub. An exemplary modular construction system comprises at least one of the channel members fabricated by stamping; molding; extruding; machining; cutting; and casting.

From the foregoing description, it will be recognized by one of skill in the art that a quick attachment system which is capable of being incorporated into a modular frame unit has been disclosed. The modular frame unit may be utilized for selectively and adjustably mounting wall panels on either or both sides of a free-standing panel wall system. An embodiment may include generally a plurality of horizontally disposed rails, a plurality of vertical upright supports carried on either or both sides of the horizontal rails, and a registration mechanism for selectively positioning the horizontal rails and vertical supports relative to each other. Horizontal rails may be incrementally adjustable along vertical supports which may be incrementally adjustable along the horizontal rails. Thus, panels may be dimensioned in view of the incremental registration between the horizontal rails and the vertical support. A plurality of exemplary free-standing panel walls may be used in combination with each other to define any selected configuration or wall arrangement. Connectors configured to join respective horizontal rails of two or more free-standing panel walls may be provided. An exemplary free-standing panel modular construction wall system may be both strong and stable. A main section may comprise at least one substantially rigid and generally U-shaped (in cross section) floor rail having a face web which may lie flat on, and, as needed, may be anchored to, the floor of an establishment with opposite side webs projecting upwardly from the floor, or which may be supported above the floor of an establishment by flanges defined by the U-shaped main section. The width of the face web of the floor rail may be chosen to provide for the placement of floor anchors spaced apart laterally on the face web to provide laterally spaced apart points of anchoring of the floor rail to the floor. In other embodiments of the present panel wall system, no anchoring of the wall system to the floor may be required.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept. Also, unless applicants have expressly disavowed any subject matter within this application, no particular embodiment or subject matter is considered to be disavowed herein. The claims should not be read as limited to the described order or elements unless stated to that effect.

Having thus described the aforementioned invention, what is claimed is:

1. A multiple connection method for sections of modular frames, the method comprising:
   providing a plurality of sections of modular frame, each section comprising
      a pair of parallel rigid upright members,
         each upright member defining a plurality of locations along a height dimension thereof, and
      a plurality of resilient U-shaped channel segments,
         each U-shaped channel segment having a longitudinal dimension, a substantially planar web, and opposite first and second flanges extending along opposite longitudinally extending edges of the web,
         each U-shaped channel segment being fixed at one of the locations between the pair of upright members with the longitudinal dimension of the segment extending substantially perpendicular to the height dimension of the pair of upright members,
         each flange of each U-shaped channel segment defining at least one first mating connector portion along the longitudinal dimension of the U-shaped channel segment;
   positioning at least two sections in adjacent, spaced apart relationship to one another with at least one segment of said plurality of U-shaped channel segments in longitudinal alignment with another segment of said plurality of U-shaped channel segments;
   providing a resilient U-shaped joinder channel having a longitudinal dimension, a substantially planar web, and opposite first and second flanges extending along opposite longitudinally extending edges of the web, each flange of the joinder channel defining a plurality of second mating connector portions at spaced apart locations along the longitudinal dimension of the joinder channel; orienting the joinder channel to extend longitudinally between a pair of longitudinally aligned U-shaped channel segments;

wherein adjacent channel segments and a corresponding joinder channel are capable of slight resilient deformation, such that upon mating, the flanges of the joinder channel may be slightly deformed and/or the flanges of the adjacent channel segments may be slightly deformed either to allow the joinder channel to surround the flanges of the adjacent channel segments or to allow the flanges of the adjacent channels to surround the joinder channel thereby establishing an at least partial frictional connection; and mating, via a positively engaging snap fit, at each longitudinal end of the joinder channel, at least one second mating connector portion of each flange of the joinder channel with a respective first mating connector portion of a corresponding flange of an adjacent, longitudinally aligned U-shaped channel segment to secure the joinder channel in a longitudinally end-to-end configuration between corresponding U-shaped channel segments of two modular frame sections, thereby releasably joining via the snap fit the at least two U-shaped channel segments to form a modular frame.

2. The method of claim 1, wherein each provided plurality of U-shaped channel segments of each provided section further comprises a first segment and a second segment, each first segment being disposed proximate, but offset from, a first end of the associated pair of upright members and each second segment being disposed proximate, but offset from, an opposite second end of the associated pair of upright members.

3. The method of claim 1 further comprising the operation of positioning a lower end of each upright member of each section against a track.

4. The method of claim 3 further comprising the operation of adjusting a leveling device disposed at each lower end of each upright member.

5. The method of claim 1 wherein the snap fit connection is accomplished by mating an annular, flared lip defining the first mating connector portion with a through hole defining the second mating connector portion.

6. The method of claim 5 further including the operation of inserting a fastener through at least one mated first and second connector portion.

7. The method of claim 5 further comprising the operation of, for each mated first and second connector portion, urging the first and second connector portion toward registration by engaging the first connector portion with a recesses defined along the distal edge of the joinder channel flange corresponding to the second connector portion.

8. The method of claim 1, wherein the first and second mating connector portions defined along each joinder channel and U-shaped channel segment are spaced approximately equally along respective longitudinal dimensions of the joinder channel and segment.

9. The method of claim 1 wherein the modular system is a free-standing modular wall system.

10. The method of claim 1 wherein one or more U-shaped channel segments is rotatably fixed at a location between the pair of upright members or is rotatably fixed to a U-shaped channel segment fixed between the pair of upright members.

11. The method of claim 1 wherein the longitudinal alignment of U-shaped channel segments is an end-to-end alignment, an angled alignment, a perpendicular alignment, a T-alignment, an orthogonal alignment, or a combination of those alignments.

12. A modular construction system useful in fabricating a frame, the modular construction system comprising:

a plurality of modular units, each unit comprising:

a pair of parallel rigid upright members,
each upright member defining a plurality of locations along a height dimension thereof;

a plurality of resilient U-shaped channel segments,
each U-shaped channel segment having a longitudinal dimension, a substantially planar web, and opposite first and second flanges extending along opposite longitudinally extending edges of the web, each U-shaped channel segment being fixed at one of the locations between a pair of upright members with the longitudinal dimension of the segment extending substantially perpendicular to the height dimension of the upright members, each flange of each U-shaped channel segment defining at least one first mating connector portion along the longitudinal dimension of the segment; and a plurality of resilient U-shaped joinder channels,
each joinder channel having a longitudinal dimension, a substantially planar web, and opposite first and second flanges extending along opposite longitudinally extending edges of the web, each flange of each joinder channel defining a plurality of second mating connector portions at spaced apart locations along the longitudinal dimension of the joinder channel;

wherein adjacent channel segments and a corresponding joinder channel are capable of slight resilient deformation, such that the flanges of the joinder channel may be slightly deformed either to allow the joinder channel to surround the flanges of the adjacent channel segments or to allow the flanges of the adjacent channel segments to surround the joinder channel thereby establishing an at least partial frictional connection; and wherein at each longitudinal end of each joinder channel, at least one second mating connector portion of each flange snap fits and positively engages a respective first mating connector portion of the corresponding flange of a segment to releasably secure via the snap fit the joinder channel in a longitudinally end-to-end configuration between corresponding U-shaped channel segments of two modular units.

13. The modular construction system of claim 12, each plurality of U-shaped channel segments of each modular unit further comprising a first segment and a second segment, each first segment being disposed proximate, but offset from, a first end of the associated pair of upright members and each second segment being disposed proximate, but offset from, an opposite second end of the associated pair of upright members.

14. The modular construction system of claim 13, each segment being offset from a respective end of its associated pair of upright members a distance between 1 and 6 inches.

15. The modular construction system of claim 14, each modular unit further comprising a leveling device disposed at the second end of the pair of upright members.

16. The modular construction system of claim 12, wherein each first mating connector portion comprises a first through hole having an annular, flared lip protruding outwardly from a perimeter of the hole.

17. The modular construction system of claim 16, wherein each second mating connector portion comprises a second through hole sized and shaped to receive and engage the annular, flared lip of a corresponding first mating connector portion within the second through hole.

18. The modular construction system of claim 17 further comprising a plurality of recesses defined along each distal edge of each joinder channel flange, each recess being configured to engage one of the first connector portions defined along the segments and to direct the engaged first mating connector portion toward registration with a second mating connector portion defined along the joinder channel.

19. The modular construction system of claim 18, each recess being aligned laterally outwardly from a second mating connector portion along a corresponding joinder channel flange.

20. The modular construction system of claim 19, each distal edge of each joinder channel flange defining an outward flare.

21. The modular construction system of claim 12, wherein the first and second mating connector portions defined along each joinder channel and U-shaped channel segment are spaced approximately equally along respective longitudinal dimensions of the joinder channel and segment.

22. The modular construction system of claim 12, wherein the first and second mating connector portions comprise a snap fit connector selected from the group consisting of a tongue and groove, a hole, a hollow, a mortise, a cutout, a notch opening, an orifice, and a groove.

23. The method of claim 1, wherein the first and second mating connector portions comprise a snap fit connector selected from the group consisting of a tongue and groove, a hole, a hollow, a mortise, a cutout, a notch opening, an orifice, and a groove.

24. The modular construction system of claim 12 wherein the modular system is a free-standing modular wall system.

25. The modular construction system of claim 12 wherein one or more U-shaped channel segments is rotatably fixed at a location between the pair of upright members or is rotatably fixed to a U-shaped channel segment fixed between the pair of upright members.

26. The modular construction system of claim 12 wherein the longitudinal alignment of U-shaped channel segments is an end-to-end alignment, an angled alignment, a perpendicular alignment, a T-alignment, an orthogonal alignment, or a combination of those alignments.

* * * * *